United States Patent
Bassler et al.

(10) Patent No.: US 9,726,302 B2
(45) Date of Patent: Aug. 8, 2017

(54) FLUIDIC SYSTEM, USE, AND METHOD FOR OPERATING THE SAME

(71) Applicant: FRAUNHOFER-GESELLSCHAFT ZUR FÖRDERUNG DER ANGEWANDTEN FORSCHUNG E.V., München (DE)

(72) Inventors: Michael Bassler, Mainz (DE); Klaus Stefan Drese, Mainz (DE); Daniel Latta, Mainz (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 466 days.

(21) Appl. No.: 14/388,088

(22) PCT Filed: Mar. 27, 2013

(86) PCT No.: PCT/EP2013/056585
§ 371 (c)(1),
(2) Date: Sep. 25, 2014

(87) PCT Pub. No.: WO2013/144241
PCT Pub. Date: Oct. 3, 2013

(65) Prior Publication Data
US 2015/0047732 A1   Feb. 19, 2015

(30) Foreign Application Priority Data
Mar. 27, 2012   (DE) .................. 10 2012 204 925

(51) Int. Cl.
G01N 27/453   (2006.01)
F16K 99/00   (2006.01)
(Continued)

(52) U.S. Cl.
CPC .......... F16K 99/0017 (2013.01); B01D 35/06 (2013.01); B01D 61/18 (2013.01);
(Continued)

(58) Field of Classification Search
CPC ......... B01L 3/502753; B01L 3/502784; B01L 2400/0427
See application file for complete search history.

(56) References Cited

U.S. PATENT DOCUMENTS

| | | |
|---|---|---|
| 6,406,605 B1 | 6/2002 | Moles |
| 2009/0188794 A1 | 7/2009 | Simon et al. |

(Continued)

FOREIGN PATENT DOCUMENTS

| | | |
|---|---|---|
| DE | 695 07 157 T2 | 9/1999 |
| DE | 695 30 101 T2 | 3/2004 |

(Continued)

OTHER PUBLICATIONS

Zhao et al., "Droplet manipulation and microparticle sampling on perforated microfilter membranes," Journal of Micromechanics and Mircoengineering 18 (Jan. 11, 2008), vol. 18, No. 2, pp. 1-10 ("Zhao").*

(Continued)

*Primary Examiner* — Alexander Noguerola
(74) *Attorney, Agent, or Firm* — Hudak, Shunk & Farine Co. LPA

(57) ABSTRACT

A fluidic system having a first volume, a second volume and a membrane geometrically separating the two volumes, which has an open-pore microstructure for the passage of a first medium and a second medium. There is a contact angle ($\Theta$) between the interface of the media and the pore surface. A first electrical field in the region of the membrane and a first electromagnetic radiation and a first heating of the membrane define a first state ($Z_1$), in which the membrane (Continued)

is not wetted or is less wetted by the first medium and is more heavily wetted by the second medium such that a first contact angle $\Theta_1 > 90°$ is formed between the pore surface and the interface. The first medium and the second medium and the pore surface have a surface energy of which at least one surface energy can be reversibly changed in such a way that a second contact angle $\Theta_2 < \Theta_1$ occurs between the pore surface and the interface in a second state ($Z_2$).

22 Claims, 8 Drawing Sheets

(51) Int. Cl.
*B01D 35/06* (2006.01)
*B01L 3/00* (2006.01)
*G02B 26/00* (2006.01)
*B01D 61/18* (2006.01)
*B01D 61/22* (2006.01)

(52) U.S. Cl.
CPC ........ *B01D 61/22* (2013.01); *B01L 3/502715* (2013.01); *B01L 3/502738* (2013.01); *B01L 3/502746* (2013.01); *B01L 3/502769* (2013.01); *F16K 99/004* (2013.01); *F16K 99/0025* (2013.01); *F16K 99/0042* (2013.01); *G02B 26/005* (2013.01); *B01L 2200/0673* (2013.01); *B01L 2200/146* (2013.01); *B01L 2300/0681* (2013.01); *B01L 2300/161* (2013.01); *B01L 2400/0427* (2013.01); *B01L 2400/088* (2013.01); *F16K 2099/0084* (2013.01); *Y10T 137/2191* (2015.04); *Y10T 137/2196* (2015.04)

(56) References Cited

U.S. PATENT DOCUMENTS

| 2011/0091989 A1 | 4/2011 | Sista et al. |
| 2011/0266151 A1 | 11/2011 | Janson |

FOREIGN PATENT DOCUMENTS

| DE | 10 2006 008 324 B3 | 4/2007 |
| DE | 10 2009 015 562 A1 | 10/2010 |
| DE | 10 2009 045 403 A1 | 4/2011 |
| WO | 96 12540 A1 | 5/1996 |
| WO | 96 12541 A1 | 5/1996 |
| WO | 2009 094626 A1 | 7/2009 |
| WO | 2012018301 A1 | 2/2012 |

OTHER PUBLICATIONS

Vlassiouk et al., "Control of Nanopore Wetting by a Photochromic Spiropyran—a Light-Controlled Valve an Electrical Switch," Nano Lett. May 2006; 6(5): 1013-1017.*

* cited by examiner

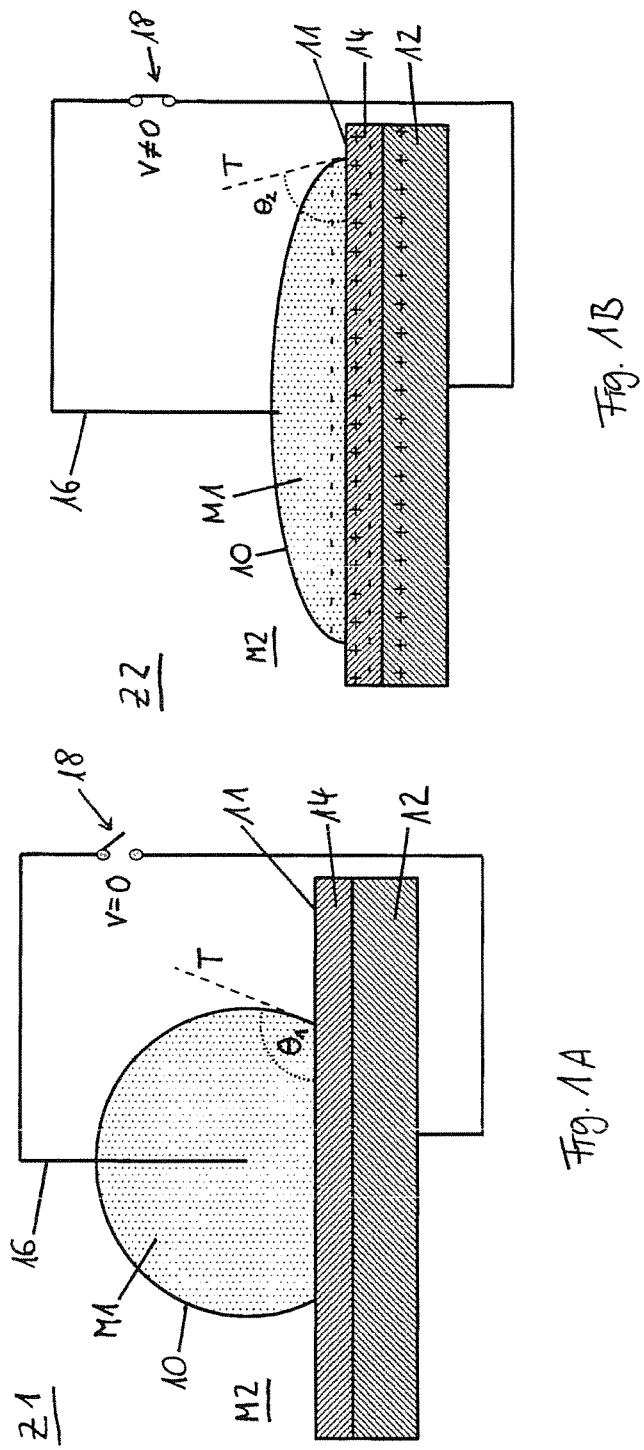

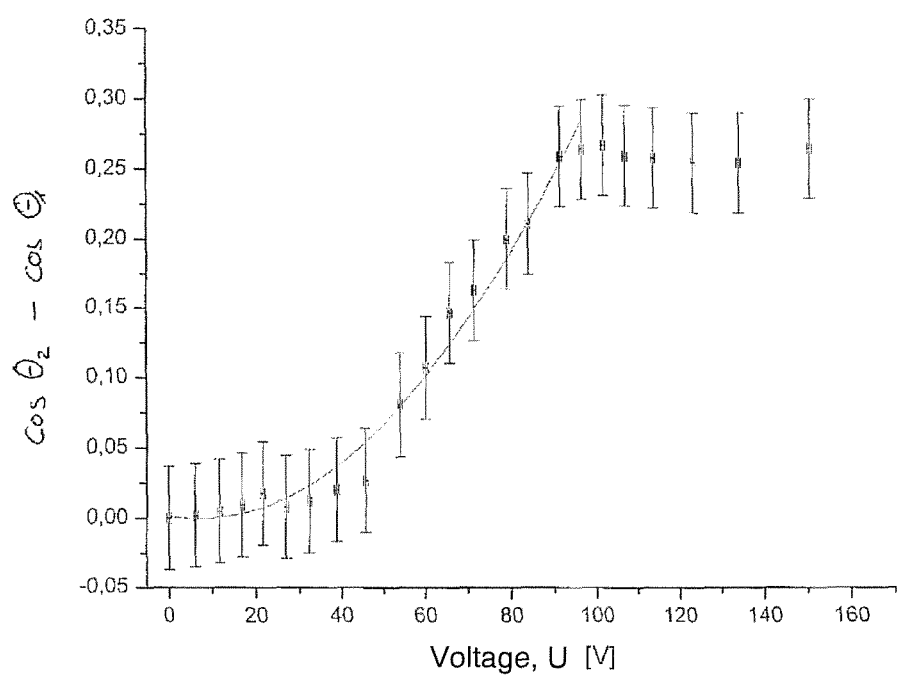

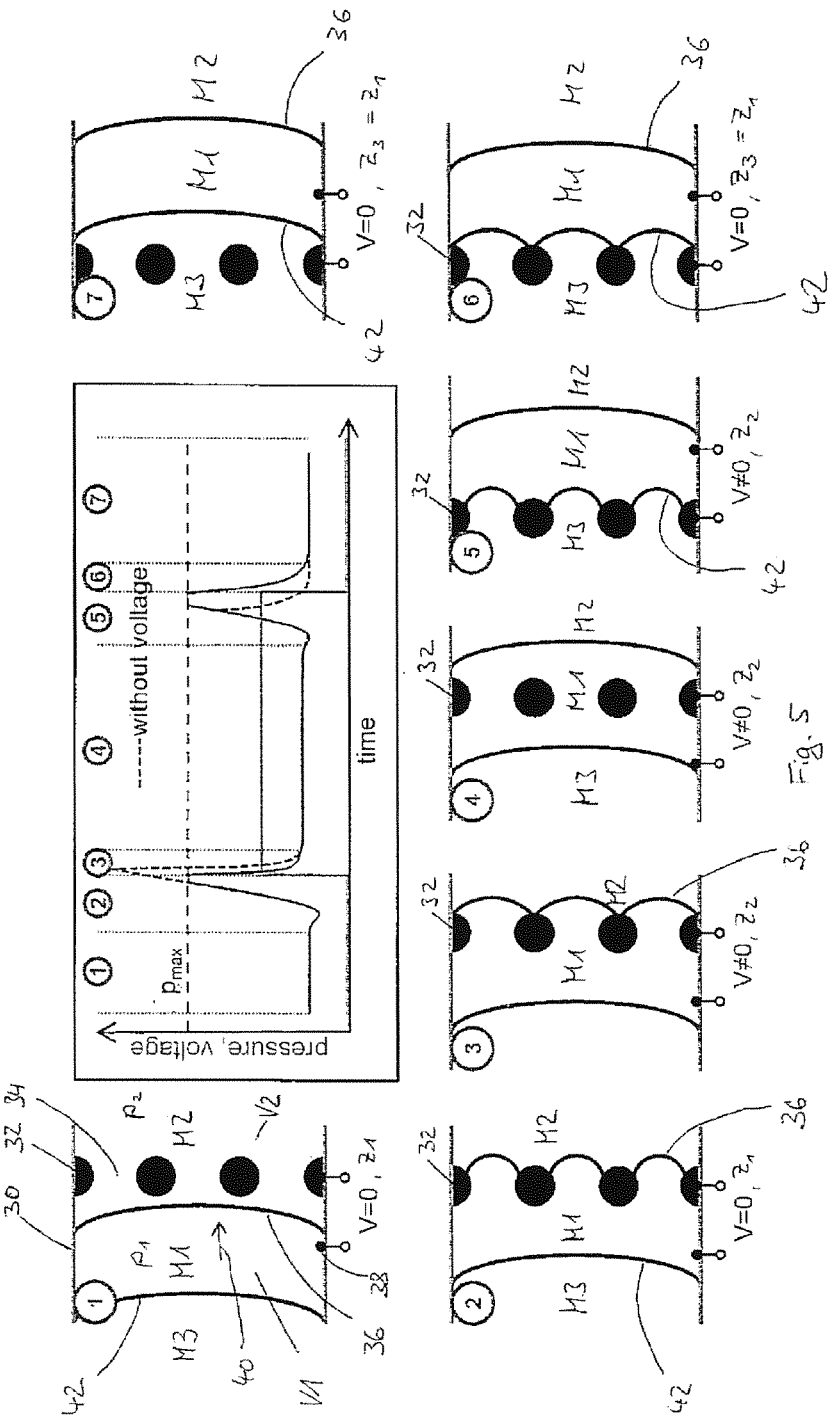

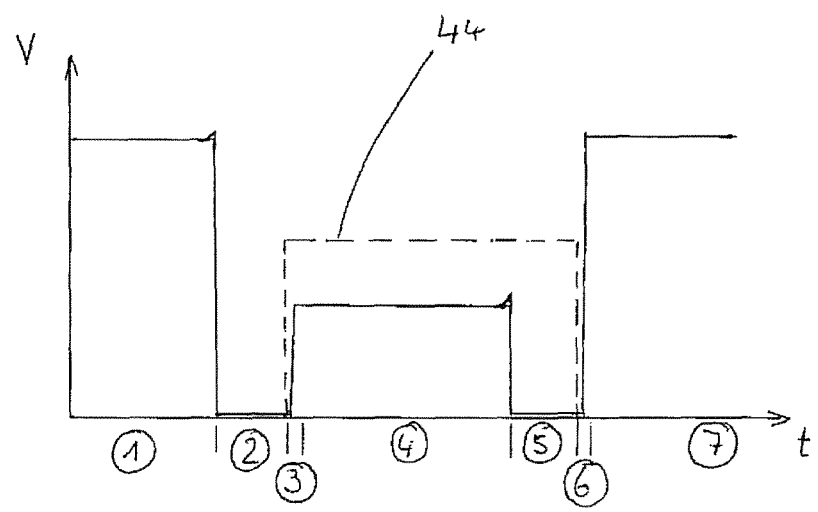

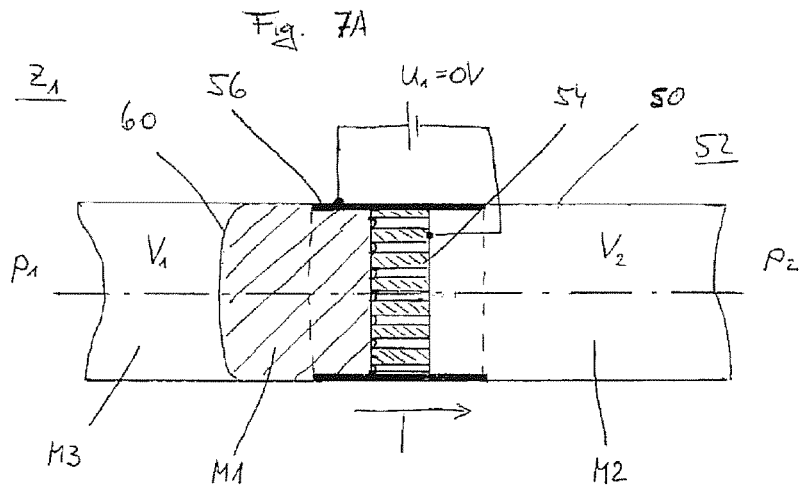
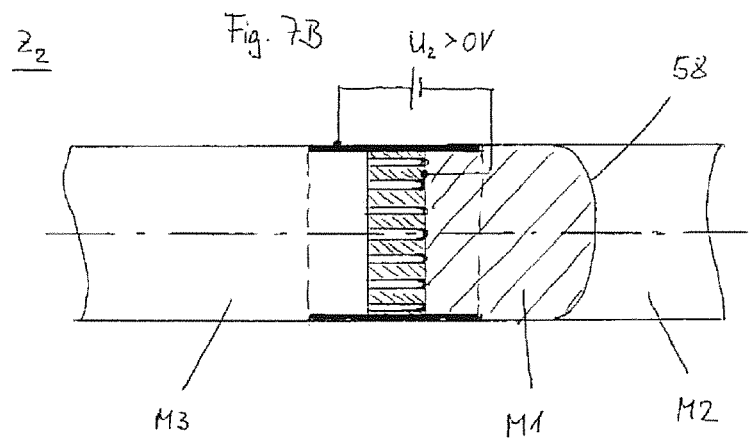
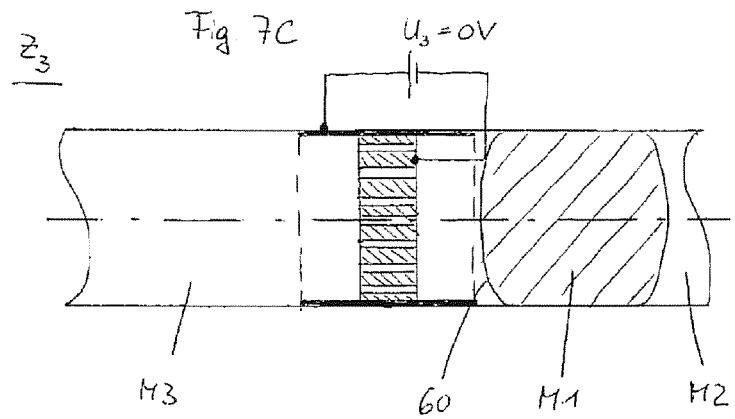

FLUIDIC SYSTEM, USE, AND METHOD FOR OPERATING THE SAME

FIELD OF THE INVENTION

The invention concerns a fluidic system, especially a microfluidic system, with a first volume, a second volume, and a membrane geometrically separating the two volumes, which provides an open-pore microstructure with a pore surface for the passage of a first medium and a second medium, between which a boundary surface is formed, while a contact angle exists between the boundary surface and the pore surface. The invention moreover concerns the use of a fluidic system and a method for its operation.

A "fluidic system" in the sense of this document is composed of at least three components: a shape-stable, bodily arrangement, i.e., a solid, a first medium or fluid, and a second medium or fluid. The solid contains a substrate in which one or more fluidic lines are incorporated, and a membrane separating the fluidic line spatially into two segments, namely, the first and the second volume.

By "volume" in the sense of the present document is generally meant a cavity for the physical containment of the media, and the term "fluidic line" shall also be used synonymously with this in what follows.

By "membrane" is quite generally denoted a solid which is suitable to produce that spatial or geometrical separation and at the same time create a barrier which is suitable to present an increased flow resistance to a medium flowing through, more precisely, to let the two media pass under different conditions. A different condition under which the two media pass is, for example, the pressure difference required for the passage. In order for the media to be able to pass, it is required that the membrane have an "open pore" structure and, more precisely, an open-pore micro or nanostructure. Accordingly, by "pores" is generally meant openings permeable to the media. A membrane can be present, for example, in the form of a lattice, a fiber composite, a meshwork, a honeycomb or sponge-like structure, a metal foam or the like. All that is important is that the structures be open-pore. The membrane and the substrate of the fluidic line are preferably not a single piece and also not made from the same material.

The two media are arranged next to each other in the fluidic line and define the "boundary surface" or also "phase boundary". The two "media" are also designated as a fluid or phase. They may be two liquids, such as a water-based and an oil-based liquid, or one liquid and one gas, such as air. In the latter case, instead of a boundary surface or phase boundary one also speaks of a "surface". The critical criterion is that the two media not be soluble in each other, chemically combine or mix entirely with each other.

A "microfluidic system" is distinguished by the handling of liquid volumes of 1 ml or less, but generally not much below one µl. Accordingly, fluidic channels are provided in it mostly or at least frequently having cross sections and/or structure with dimensions in the range of 1 mm or less.

The invention deals with the interaction between the two media and the solid material of the membrane, more precisely, the surface of the membrane pores.

BACKGROUND OF THE INVENTION

Such a system is known, for example, from patent application laid open DE 10 2009 045 403 A1. The device there serves to separate gas and liquid or generally to separate a dispersed phase from a continuous phase and for this purpose it has an intake channel and a discharge channel for the gas and liquid mixture. Between the two channels is arranged a membrane in the form of several capillary channels, which join the intake channel to the discharge channel. The separation of the two phases occurs by a controlling of the pressure difference between the first and the second channel, taking into account the capillary forces in the capillary channels, wherein the wetting behavior ensures that the gas by virtue of the surface tension is held back and collected either before or in the capillary channels until all of the capillary channels are blocked by the increasing gas bubble. After this there occurs a pressure increase with which the gas bubble ultimately overcomes the surface tension and is emptied through the capillary channels. This device can be used on the one hand to determine the position of a gas accumulation, to determine the position of a liquid drop, or to separate the gas and liquid mixture. Depending on the application, it may be a drawback in this or similar systems that the membranes due to the wetting behavior hinder the transport of the liquid upon entering or leaving the membrane so much that high pressures or pressure differences are needed under such alternating drying, wetting, and drying. In many applications, the required pressure differences cannot be produced in a microfluidic system or the membranes cannot withstand them mechanically or a breakthrough of the liquid through the membrane results in an uncontrolled liquid transport. Furthermore, it can happen that the capillary channels in event of a breakthrough are not necessarily completely emptied, so that unwanted liquid residues remain on and in the membrane.

SUMMARY OF THE INVENTION

The problem of the invention is to provide means which ensure the function of the membrane and at the same time guarantee a secure fluid control in a fluidic system of the kind mentioned at the outset.

The problem is solved by a fluidic system comprising: a first volume, a second volume, and a membrane geometrically separating the two volumes, which provides an open-pore microstructure with a pore surface for passage of a first medium and a second medium, between which a boundary surface is formed, while a contact angle exists between the boundary surface and the pore surface, wherein electrodes for imposing an electric field in a region of the membrane and/or an electromagnetic radiation source acting on the membrane and/or means for heating or cooling the membrane, wherein the membrane in a first state $Z_1$ with a first electric field $E_1$ and a first electromagnetic radiation exposure $S_1$ and a first temperature $T_1$ has a pore surface which is not wetted or less wetted by the first medium and more heavily wetted by the second medium so that a first contact angle $\Theta_1 > 90°$ is formed between the pore surface and the boundary surface in the first medium, and wherein the first medium and the second medium and the pore surface have a surface energy, of which at least one surface energy can be changed reversibly in dependence on the electric field or by means of electromagnetic radiation exposure or temperature change so that in a second state $Z_2$ with a second electric field $E_2 \neq E_1$ and/or a second electromagnetic radiation exposure $S_2 \neq S_1$ and/or a second temperature $T_2 \neq T_1$ a second contact angle $\Theta_2 < \Theta_1$ is formed between the pore surface and the boundary surface, a use of a fluidic system as a filter in a fluidic system, and use of a fluidic system in a valve in a fluidic system, and a method for operating a fluidic system with a first volume, a second volume, and a membrane geometrically separating the two volumes, which provides an open-pore microstructure with a pore surface, comprising the steps:—producing a first state $Z_1$ with a first electric field $E_1$ in a region of the membrane and a first electromagnetic radiation exposure $S_1$ acting on the membrane and a first temperature $T_1$ of the membrane, wherein the pore surface, a first medium and a second medium have surface energies and wherein the membrane has a pore surface which is not wetted or less wetted by the first medium and more heavily wetted by the second medium, —transporting the first medium and the second medium, between which a boundary surface is formed, from the first volume through the membrane into the second volume until the boundary surface touches the membrane, wherein a first contact angle $\Theta_1 > 90°$ is formed between the pore surface and the boundary surface in the first medium and the transporting is halted while the first medium is still situated mainly in the first volume and the second medium is already mainly in the second volume, —producing a second state $Z_2$ with a second electric field $E_2 \neq E_1$ in the region of the membrane and/or a second electromagnetic radiation exposure $S_2 \neq S_1$ acting on the membrane and/or a second temperature $T_2 \neq T_1$ of the membrane, wherein at least one surface energy is reversibly changed so that a second contact angle $\Theta_2 < \Theta_1$ is formed between the pore surface and the boundary surface, and— further transporting of the first and second medium until the first medium is also taken through the membrane and mainly into the second volume, wherein the second contact angle in the second state is $\Theta_2 < 90°$. An advantageous modification of the invention is the subject matter of the subclaims.

The fluidic system of the above-mentioned kind is characterized optionally or in combination by electrodes for imposing an electric field in the region of the membrane, by an electromagnetic radiation source acting on the membrane, and by means for heating or cooling the membrane. The membrane in a first state $Z_1$ with a first electric field $E_1$ and a first electromagnetic radiation exposure $S_1$ and a first temperature $T_1$ has a pore surface which is not wetted or less wetted by the first medium and more heavily wetted by the second medium so that a first contact angle $\Theta_1 > 90°$ is formed between the pore surface and the boundary surface in the first medium. The first medium and the second medium and the pore surface each have a specific surface energy, also termed the free energy of the surface, and which can be equated to the surface tension of liquid media, of which at least one surface energy can be changed reversibly in dependence on the electric field or by means of electromagnetic radiation exposure or temperature change so that in a second state $Z_2$ with a second electric field $E_2 \neq E_1$ and/or a second electromagnetic radiation exposure $S_2 \neq S_1$ and/or a second temperature $T_2 \neq T_1$ a second contact angle $\Theta_2 < \Theta_1$ is formed between the pore surface and the boundary surface.

This system comprises, for example, a first medium, such as water, having a stronger potential than the second medium, such as oil or air. Between the media and the pore surface interactions occur in the first state according to the invention, as a result of which the first medium wets the pore surface less than the second medium. In the second state, on the other hand, interactions occur as a result of which the first medium wets the pore surface at least more heavily than before and ideally even more heavily than the second medium. But the system also describes the reverse case, in which the first medium, such as oil or air, is less polar than the second medium, such as water, and as a result of a now different surface energy of the pore surface in the first state once again interactions occur between the media and the pore surface, as a result of which the nonpolar first medium wets the pore surface less than the second medium. The other surface energy of the pore surface can be accomplished by using a different starting material for the pore surface and/or by selecting a different state $Z_1$.

The contact angle between the boundary surface of the two media and the surface expresses the ratio of the wettability of the pore surface with the first medium to the wettability of the pore surface with the second medium. If the pore surface is less wettable by the first medium, such as water, than by the second medium, such as air—i.e., the surface is hydrophobic—this circumstance can be expressed by a contact angle $>90°$. The same holds for the reverse arrangement: if the first, less wetting medium is air and the second more heavily wetting medium is water—i.e., the surface is hydrophilic—this circumstance will also be expressed by a contact angle $\Theta_1 > 90°$. Accordingly, the contact angle between the pore surface and the boundary surface $\Theta_1$ as well as $\Theta_2$ per the above definition is plotted each time "in the first medium" between the pore surface and the boundary surface.

Thus, the first medium will not penetrate into the pores of the membrane without an external pressure acting on it. Therefore, in order to force the medium 1 into the pores of the membrane, an excess pressure or a pressure difference is required, the dimension of which depends on the surface tensions of the media and the pore geometry.

The invention exploits the fact that the required pressure difference can also be influenced by manipulating the contact angle.

The changing of the at least one surface energy of that pore surface and/or of the media—it basically comes down to a relative change in surface energies with respect to each other—and thus the changing of the wettability is familiar, for example, in the form of "electro-wetting". In this regard, refer for example to the document WO 2009/094626A1, which deals with letting a drop seep into a porous substrate with an initially non-wetting honeycomb pore structure and underneath a fiber like wetting wick structure. The honeycomb pore structure is composed of a metallic core skeleton, which is provided with a dielectric material and on top of it a non-wetting coating. The metallic base structure is electrically contacted. An electrical counterelectrode is connected to the drop. If a voltage is applied between the metallic base structure and the drop, the state of the system switches over and the drop wets the surface of the honeycomb structure, penetrates into it, and arrives at the underlying wetting wick structure.

The documents WO 96/12540 A1 and WO 96/12541 A1 also mention electro-wetting in another application. A method is described for diffusion exchange of two fluid flows guided in parallel along a membrane and making contact there, wherein a change in the wetting of the membrane surface is supposed to improve the efficiency of the exchange process.

The above described phenomenon of electro-wetting is only one of three possibilities for changing the surface energy so that the wetting behavior of the two media is changed. Alternatively, an electromagnetic radiation source acting on the membrane is proposed, whose radiated electromagnetic energy can bring about, for example, a change in the surface energy of the solid by altering its molecular bond structure. The advantage of this configuration over electro-wetting is that no contacting is necessary. The switchover can occur without contact.

A third alternative calls for switching the contact angle by means of temperature change. This effect is also known as "thermocapillarity". Here as well, the energy content and consequently the surface energy of the media involved changes, in particular to a differing extent. This embodiment as well can be done without contact, for example, by using a thermal radiator and making the membrane surface absorbing.

The three alternatives will be selected for efficiency, depending on the material, and can also be combined if need be.

Regardless of the alternatives used, the present invention avails itself of their common effect, namely, the reversible manipulation of the contact angle. "Reversible" in the sense of the invention will also include partially reversible processes in which a hysteresis occurs, so that after returning to the initial state the identical wetting behavior and thus the same contact angle need no longer be present, but at least a substantial change in the wetting behavior in the reverse direction occurs.

Accordingly, the method of the invention for operating a fluidic system with a first volume, a second volume, and a membrane geometrically separating the two volumes, which provides an open-pore microstructure with a pore surface, calls for the following steps:

producing a first state $Z_1$ with a first electric field $E_1$ in the region of the membrane and a first electromagnetic radiation exposure $S_1$ acting on the membrane and a first temperature $T_1$ of the membrane, wherein the pore surface, a first medium and a second medium have surface energies and wherein the membrane has a pore surface which is not wetted or less wetted by the first medium and more heavily wetted by the second medium, transporting the first medium and the second medium, between which a boundary surface is formed, from the first volume through the membrane into the second volume until the boundary surface touches the membrane, wherein a first contact angle $\Theta_1>90°$ is formed between the pore surface and the boundary surface in the first medium and the transporting is halted while the first medium is still situated mainly in the first volume and the second medium is already mainly in the second volume, producing a second state $Z_2$ with a second electric field $E_2 \neq E_1$ in the region of the membrane and/or a second electromagnetic radiation exposure $S_2 \neq S_1$ acting on the membrane and/or a second temperature $T_2 \neq T_1$ of the membrane, wherein at least one surface energy is reversibly changed so that a second contact angle $\Theta_2 < \Theta_1$ is formed between the pore surface and the boundary surface, further transporting of the first and second medium until the first medium is also taken through the membrane and mainly into the second volume.

The change in state especially in regard to the temperature should preferably be confined to the extent that none of the media (fluids) undergo a phase transition, in particular, does not become solid.

One advantageous modification of the invention calls for the second contact angle being $\Theta_2 < 90°$.

In this case, the switching from the system state $Z_1$ to the state $Z_2$ has the effect that the initially less wetting first medium becomes a more heavily wetting first medium. Of course, this is not necessary to transport the first medium under less pressure outlay through the pores of the membrane than in state $Z_1$. Even so, this configuration represents an advantageous special case enabling a more secure process management.

The first state is preferably defined by a first electric field $E_1=0$, a first electromagnetic radiation exposure $S_1$ in the form of daylight or room lighting or darkness, and a first temperature $T_1$ in the range of room temperature.

Under these conditions, also known as "ambient conditions", the adjusting of the first state $Z_1$ is preferably not actively done, but instead is defined by the ambient conditions themselves. A first state so defined enables the operating of a microfluidic chip, for example, with the microfluidic system of the invention in a simple way. Without active intervention at the outset, the first medium and the second medium are transported from the first volume through the membrane into the second volume until the boundary surface touches the membrane and the transport stops. By switching on an electric field and/or irradiation with additional electromagnetic energy and/or raising or lowering the temperature of the pore surface, the state $Z_2$ is then produced, in which the membrane then becomes permeable to the first medium.

A specific sample embodiment of the system or method calls for a pore surface which is hydrophobic in the first state, while the first medium is a water-based liquid. An advantageous modification of this calls for the second medium being a gas, especially air. Alternatively, the second medium can also be an oil-based liquid.

Alternatively to this sample embodiment, the pore surface in the first state is lipophobic and the first medium is an oil-based liquid. The second medium in this configuration is preferably either a gas, especially air, or alternatively a water-based liquid.

As a further alternative, the pore surface in the first state is hydrophilic and the second medium is a water-based liquid. The first medium is then preferably an oil-based liquid or a gas, especially air.

Yet another alternative calls for the pore surface in the first state to be lipophilic and the second medium is an oil-based liquid. The first medium is then preferably a water-based liquid or a gas, especially air.

Preferably the fluidic system has a pump for transporting the media from the first volume through the membrane into the second volume.

The transporting can be volume-controlled or pressure-controlled. In the first case, the transporting occurs up to a maximum delivery pressure $P_{max}$ with a constant volume flow $V_c$. The pump is correspondingly organized in this embodiment of the invention.

The first contact angle $\Theta_1$ corresponds physically to a breakthrough pressure $P_{dhi}$ at which the boundary surface passes through the membrane. By "breakthrough pressure" is meant here essentially the pressure difference in front of and behind the second medium. The breakthrough pressure increases with rising contact angle due to the boundary surface tension of the media and otherwise depends essentially on the geometry of the membrane pores. Preferably, the breakthrough pressure $P_{dhi}$ and the maximum delivery pressure $P_{max}$ are chosen such that the breakthrough pressure $P_{dhi}$ is greater than the maximum delivery pressure $P_{max}$.

In this configuration, the transporting of the media from the first volume through the membrane into the second volume will stop as soon as the boundary surface touches the membrane between the two media.

In one advantageous modification of the invention, the second contact angle $\Theta_2$ corresponds to a breakthrough pressure $P_{dlo}$ at which the boundary surface passes through the membrane and which is smaller than the maximum delivery pressure $P_{max}$.

The state $Z_2$ and thus the contact angle $\Theta_2$ and the maximum delivery pressure $P_{max}$ are thus chosen such that, by switching from state $Z_1$ to state $Z_2$ while maintaining the delivery condition, i.e., the constant volume flow $V_c$, up to the maximum delivery pressure $P_{max}$, the boundary surface formed between the media will be transported through the membrane and the first and second medium will go on through the membrane into the second volume.

Furthermore, the fluidic system preferably has a pressure sensor which is arranged and designed so that a pressure change in the first or second volume is detected and a pressure change signal is put out.

Advantageously, moreover, there is provided a controller which is designed, in response to the pressure change signal and upon going above a threshold pressure in the first volume or going below a threshold pressure in the second volume, to put out a switching signal to a power supply for the electrodes or to the electromagnetic radiation source or to the means of heating the membrane.

In terms of method, the purpose here is to deliver the first medium and the second medium from the first volume through the membrane into the second volume until the boundary surface touches the membrane, whereupon the delivery stops while the first medium is still essentially in the volume and the second medium is already essentially in the second volume, because in this state the maximum delivery pressure $P_{max}$ is not enough to force the boundary surface through the membrane. Consequently, the pressure quickly increases in the first volume up to the maximum delivery pressure. Accordingly, the pressure drops in the second volume. This pressure change is detected and a corresponding signal is put out to the controller, which in turn causes an electric field to be applied in the region of the membrane and/or electromagnetic radiation to be beamed onto the membrane and/or a heating of the membrane in response to this, i.e., it produces the second state, provided that a previously determined threshold pressure setting is crossed. Depending on the use, the change in state can also be set in motion with a time delay. The time delay, in turn, can be automatically produced by the controller. The breakthrough pressure then drops below the maximum delivery pressure $P_{max}$ to the value $P_{dlo}$, so that the first and second media can be further transported until the first medium is also transported through the membrane into the second volume.

In this way, one can cause an automatic changing of the contact angle between the pore surface and the boundary surface with simple means.

In the case of pressure-controlled transport, the transporting occurs with a constant delivery pressure $P_c$. The pump is designed appropriately in this embodiment of the invention.

It is advantageous in this case for the first contact angle $\Theta_1$ to correspond to a breakthrough pressure $P_{dhi}$ at which the boundary surface passes through the membrane and which is larger than the constant delivery pressure $P_c$. Moreover, it is advantageous for the second contact angle $\Theta_2$ to correspond to a breakthrough pressure $P_{dlo}$ at which the boundary surface passes through the membrane and which is smaller than the constant delivery pressure $P_c$.

For purposes of an automatic pressure control, a volume flow sensor is provided in this embodiment of the fluidic system which is arranged and designed to detect a change in the volume flow in the second volume and put out a volume flow change signal.

Advantageously, moreover, there is provided a controller in the fluidic system which is designed, in response to the volume of the flow change signal and upon going below a threshold volume flow, to put out a switching signal to a power supply for the electrodes or to the electromagnetic radiation source or to the means of heating the membrane.

In terms of method, the first medium and the second medium is thus transported from the first volume through the membrane into the second volume until the boundary surface touches the membrane, whereupon the transport stops while the first medium is still essentially in the volume and the second medium is already essentially in the second volume, because in this state the constant delivery pressure Pc is not enough to force the boundary surface through the membrane. Consequently, the volume flow very quickly breaks off and a volume flow change is detected and a corresponding signal is put out to the controller, which in turn causes an electric field to be applied in the region of the membrane and/or electromagnetic radiation to be beamed onto the membrane and/or a heating of the membrane in response to this, i.e., it produces the second state $Z_2$, provided that a previously determined threshold volume flow setting is crossed. Depending on the use, the change in state can also be set in motion with a time delay. The time delay, in turn, can be automatically produced by the controller. The breakthrough pressure then drops below the constant delivery pressure $P_c$ to the value $P_{dlo}$, so that the first and second media can be further transported until the first medium is also transported through the membrane into the second volume.

One advantageous modification of the method calls for the first medium to have a limited volume with a second boundary surface to a third medium formed at its end in the delivery direction, while the further transporting of the first medium through the membrane into the second volume stops when the second boundary surface touches the membrane and a third contact angle $\Theta_3$ arises between the second boundary surface and the pore surface.

The method then advantageously has the additional steps:
producing a third state $Z_3$ with a third electric field $E_3 \neq E_2$ in the region of the membrane and/or a third electromagnetic radiation $S_3 \neq S_2$ acting on the membrane and/or a third temperature $T_3 \neq T_2$ of the membrane, wherein by changing at least one surface energy a fourth contact angle $\Theta_4 < \Theta_3$ is formed between the pore surface and the boundary surface,
further transporting of the first medium in the second volume.

In the mentioned manner, a detachment of the second boundary surface is accomplished between the first and the third medium in the same way used already to accomplish the passing of the first boundary surface through the membrane.

The second and the third medium are preferably the same, so that the third contact angle $\Theta_3$ is also equal to the second contact angle $\Theta_2$, each time in relation to the first medium.

Especially preferably, the first state $Z_1$ and the third state $Z_3$ are equal ($Z_1=Z_3$). To put it simply, if ambient conditions were prevailing in the first state $Z_1$, then the state $Z_3$ is produced by simply switching off once more the electric field that was switched on in state $Z_2$ and/or the electromagnetic radiation that was switched on in state $Z_2$ and/or the heat supply that was switched on in state $Z_2$.

Preferably, the fluidic system and the method are designed so that the first contact angle is $\Theta_1 > 90°$ when adjusting the first state $Z_1$ and the second contact angle is $\Theta_2 < 90°$ when adjusting the second state $Z_2$. Again, preferably, the third contact angle is $\Theta_3 < 90°$ when adjusting the second state $Z_2$ and the fourth contact angle is $\Theta_4 > 90°$ when adjusting the third state $Z_3$.

Under the assumption that the second medium and the third medium are the same and that the first state and the third state are the same, this necessarily follows from the requirement that the first contact angle be $\Theta_1 > 90°$ and the second contact angle be $\Theta_2 < 90°$, because then the third contact angle $\Theta_3$ is identical to the second contact angle $\Theta_2$ and the fourth contact angle $\Theta_4$ is equal to the first contact angle $\Theta_1$.

In the fluidic system, one first electrode is preferably formed by a conducting substrate of the membrane or a conducting coating of the membrane.

For example, this can be a metal lattice or metal weave or metal foam or such a substrate structure made from a conductive polymer. Alternatively, the substrate structure can also be made from a nonconducting material, such as a ceramic or a nonconducting polymer that is coated or covered with a conducting layer.

Preferably a layer of a dielectric is placed on top of the first electrode, i.e., the conducting substrate or the conducting coating of the membrane.

The dielectric especially preferably forms the pore surface directly. Alternatively, the material forming the surface can be applied as an additional layer on top of the dielectric.

The coating method used can be, for example, plasma-supported deposition from the gas phase, deposition of a layer from the liquid phase, vaporization or sputtering. The coating forming the pore surface preferably has polytetra-fluorethylene (PTFE), perfluorisobutene (PFIB), Parylene. A suitable coating is marketed under the brand name "lipocer" by Plasma Electronic GmbH.

Especially preferably, a second electrode is arranged each time directly adjacent to the membrane in the first and second volume.

Electrode arrangements along a membrane in fluidic systems are fundamentally known from other applications. Thus, for example, an electrode arrangement is described in DE 10 2006 008 324 B3 for contacting of a liquid on either side of a membrane for the purpose of filtering conducting particles. The arrangement of a measuring electrode on top of a filter membrane is discussed in DE 10 2005 015 562 A1 for the determination of the filter state.

However, there is essentially no electrically conducting connection between the second electrode and the medium. Any electrical field in the region of contact between the media and the pore surface of the membrane will ensure a charge shift in the case of electro-wetting and thus a manipulation of the contact angle. However, the direct contacting of the media is very efficient, because this builds up a very local field over the dielectric and thus the site of the interfaces. The second electrode therefore serves in this preferred embodiment for direct contacting of the media. The immediate proximity of the two electrodes brings about a high field strength at the site of the interfaces at low voltage. Whereas in state $Z_1$ the first electric field is preferably $E_1=0$ V/m, the second electric field $E_2$ in state $Z_1$ preferably has a field strength of 1 V/m to 10 kV/m.

For example, if there is a water drop in front of the membrane that is supposed to be transported through the membrane, the positioning of the second electrode must be chosen such that the drop during its passage through the membrane has constant contact with the second electrode. For this purpose, the second electrode in the first and the second volume is arranged each time directly adjacent to the membrane. In other words, the second electrode spans the membrane region such that it is formed from two parts (contiguous or not), whose spacing is not more than the length of the drop in the segment of the fluidic line between the two parts so that during the transport through the membrane it constantly has electrical contact with at least one part of the second electrode. For example, the second electrode is fashioned in the form of a contiguous metal ring on the inner wall of the fluidic line in the region of the membrane and has a free surface in front of and behind the membrane for contact with the media. Alternatively, two noncontiguous contacts can be provided in front of and behind the membrane, which are electrically conducting or also connected to separate power supplies.

The electromagnetic radiation source is preferably designed to emit light of a wavelength between 0.1 μm and 3 μm. Preferably, the electromagnetic radiation source has one or more LEDs or lasers.

The means for heating the membrane are preferably a substrate material of the membrane or a membrane coating with one or more absorption bands and a thermal radiation source which is designed to emit thermal radiation in the region of the absorption bands.

Alternatively, the substrate of the solid in which the fluidic line is embedded, such as the substrate of a microfluidic chip, can be formed locally about the membrane or entirely from an absorbing material, insofar as a heating of the fluids in the substrate is not critical.

According to another alternative, the membrane can be directly resistance-heated by passage of current or an outside heating source (such as indirect resistance heating) can be provided in the region of the membrane with a thermally conducting connection between this and the membrane.

Finally, the problem is solved by the use of a fluidic system of the above described kind as a filter in a fluidic system, especially a microfluidic system, for example, for the separation of liquid columns, generating and combining of droplets in droplet fluidics, or the like.

In another use according to the invention, the fluidic system of the above described kind is used as a valve in a fluidic system, especially a microfluidic system.

The advantage over traditional valves is that the fluidic system of the above described kind makes do with no moving parts and therefore is less prone to wear.

BRIEF DESCRIPTION OF THE DRAWINGS

Further features and benefits of the invention shall be explained below by means of sample embodiments. There are shown in the figures:

FIGS. 1A-B, a schematic diagram to explain "electro-wetting";

FIG. 2, a diagram of the contact angle plotted against a potential difference;

FIG. 5, a schematic representation of the method for operating a fluidic system in a sequence of 7 consecutive snapshots;

FIG. 6A-B, a pressure and volume flow curve for the sequence of FIG. 5;

FIG. 7A-C, the fluidic system in schematic representation;

DETAILED DESCRIPTION OF THE INVENTION

Figure 3A:
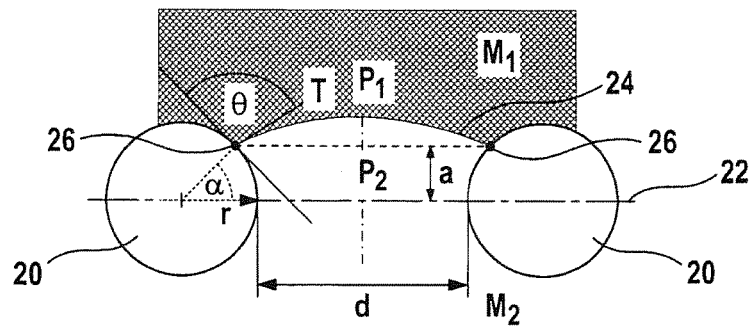
FIGS. 3A-C, a model of a membrane pore to describe the position of the boundary surface in dependence on the pressure in the media.

By means of FIGS. 1A and 1B, the wetting behavior is described between a first medium M1, such as a liquid drop, and a second medium M2, such as a gas surrounding the liquid drop, and a surface 11 of a body which is being wetted. In order to change the wetting behavior, one makes use of the phenomenon of electro-wetting. The surface 11 of the body being wetted has, for this purpose, an electrically conducting substrate 12, forming a first electrode, on which a layer of a dielectric 14 is deposited. A second electrode 16 is dipped directly into the first medium M1. The electrodes 12 and 16 are connected to a voltage source 18.

FIG. 1A shows a state $Z_1$ in which the surface 10 is less wetted by the first medium M1, so that a first contact angle $\Theta_1 > 90°$ is formed. Between the electrodes 12 and 16 no voltage exists. In state $Z_1$, the electric field is therefore $E_1 = 0$ V/m.

FIG. 1B describes a state $Z_2$ in which a voltage is imposed between the two electrodes 12 and 16. This produces a charge shift within the dielectric 14 forming the surface 11, so that for example the surface energy of the dielectric 14 is changed relative to the state $Z_1$. Consequently, the surface 11 is wetted more heavily with the medium M1 in state $Z_2$, or in other words, the contact angle $\Theta_2$ between the boundary surface 10 and the surface 11 is decreased as compared to the contact angle $\Theta_1$ in the starting state $Z_1$. In the case depicted, it even happens that $\Theta_2 < 90°$.

The contact angle $\Theta_1$ and $\Theta_2$ in the sense of this document is always relative to the first medium, and so it is always measured between the surface 11 and the boundary surface 10 inside the medium M1.

As already mentioned elsewhere, it is not a question of the media being essentially in direct contact, as illustrated in FIG. 1. Any electrical field in the region of contact between the media and the surface of the membrane will ensure a charge shift in the case of electro-wetting and thus a manipulation of the contact angle. However, the direct contacting is very efficient, because the field is built up very locally over the dielectric whose molecular structure is responsible for the change in the contact angle.

FIG. 2 shows the behavior of the contact angle $\Theta$, more precisely the difference (cos $\Theta_2$−cos $\Theta_1$) plotted against the voltage imposed between the electrodes 12 and 16. In the specific example, a substrate is investigated with an electrically conducting coating of chromium and gold and deposited thereon a dielectric coating of Parylene C with a thickness of 7.5±1 μm. It turns out that the contact angle varies from $\Theta_1 = 89°$ in state $Z_1$ to $\Theta_2 = 74°$ in state $Z_2$. It reaches saturation over the 7.5 μm thick dielectric at a voltage of around 100 V. A further voltage rise no longer significantly decreases the contact angle. Hence, the maximum difference (cos $\Theta_2$−cos $\Theta_1$) is 0.26.

Figure 3B:
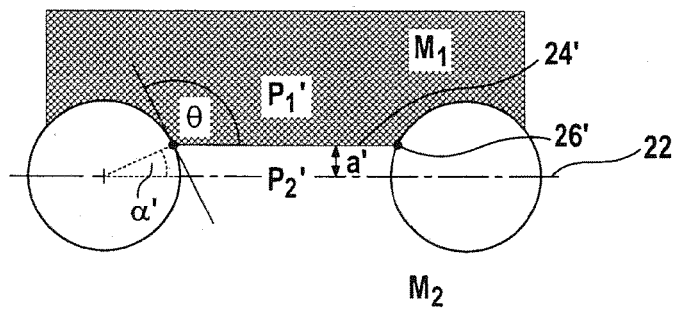
Figure 3C:
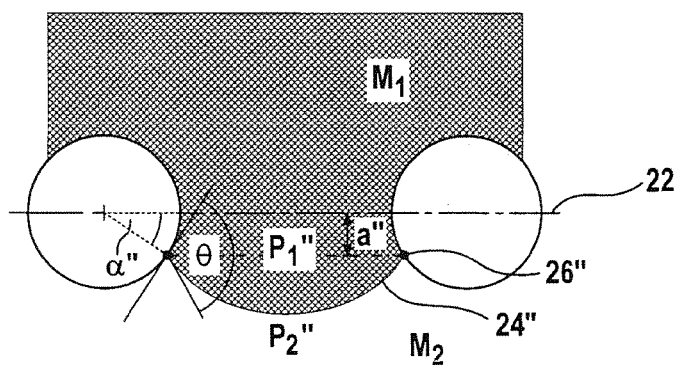

FIGS. 3A to 3C explain the changing of the position of the boundary surface in dependence on the pressure relations without manipulating the contact angle. A pore with a minimum diameter d between two membrane elements 20 which are circular in cross section is shown here as a simplified hypothesis. The circular elements represent, for example, cross sections through wires of a membrane in the form of a wire weave or the like. The two elements define a membrane plane 22.

Each time there is a medium M1 essentially above the membrane plane 22. Below the plane 22 there is a medium M2. Between the two media there is formed the boundary surface 24. A pressure P1 prevails in medium M1. A pressure $P_2$ prevails in medium M2. In the state of FIG. 3A, $P_1 < P_2$. As a result, the boundary surface 24 is bowed concavely into medium M1.

Above the center plane 22 at a distance a there are contact points 26 of the boundary surface 24 with the surface of the membrane elements 20. Equivalent to the distance a is an angle α between the membrane plane 22 and the line connecting the center point of the circular element 20 and the contact point 26. The distance a and the angle α have a negative sign for the pressure ratio $P_1 < P_2$.

The contact angle $\Theta$ results as the intermediate angle between the tangent to the surface of the membrane element 20 and the tangent T to the boundary surface 24 at the contact point 26 and it is measured inside the medium M1, as defined above.

FIG. 3B shows a state with a different pressure ratio. Here, $P_1 = P_2$, so that the boundary surface 24' is flat and parallel to the membrane plane 22. The boundary surface 24 still lies above the membrane plane 22 and therefore continues to have a negative distance a', although the magnitude is less than that of a. This is because the wettability of the media M1 and M2 is different, or in other words, the contact angle $\Theta$ is greater than 90°. However, the contact angle $\Theta$ has not changed between the state of FIG. 3A and the state of FIG. 3B.

FIG. 3C, finally, shows a state in which the pressure $P_1''$ in the first medium M1 is greater than the pressure $P_2''$ in medium M2. The result is a boundary surface 24'' with convex curvature out from the medium M1. The contact point 26'' of the boundary surface 24'' with the surface of the membrane elements 20 now for the first time has a positive distance a'' from the membrane plane 22, which corresponds to an angle α>> with likewise positive sign. An unchanged contact angle $\Theta$ is furthermore assumed.

The pressure variation, more precisely the curve of the pressure difference $P_1 − P_2 = \Delta P$, can be described in this model as a function of the angle alpha, as follows:

$$\Delta p(\alpha) = -\frac{2\gamma}{0.5d} \frac{\cos(\Theta - \alpha)}{r(1 - \cos\alpha)}$$

Here, ΔP stands for the pressure difference $P_1 − P_2$, α for the angle to parametrize the position of the boundary surface relative to the membrane plane, γ for the surface tension or boundary surface tension, $\Theta$ for the contact angle, d for the minimum pore diameter and r for the radius of curvature of the simulated membrane elements.

Figure 4:
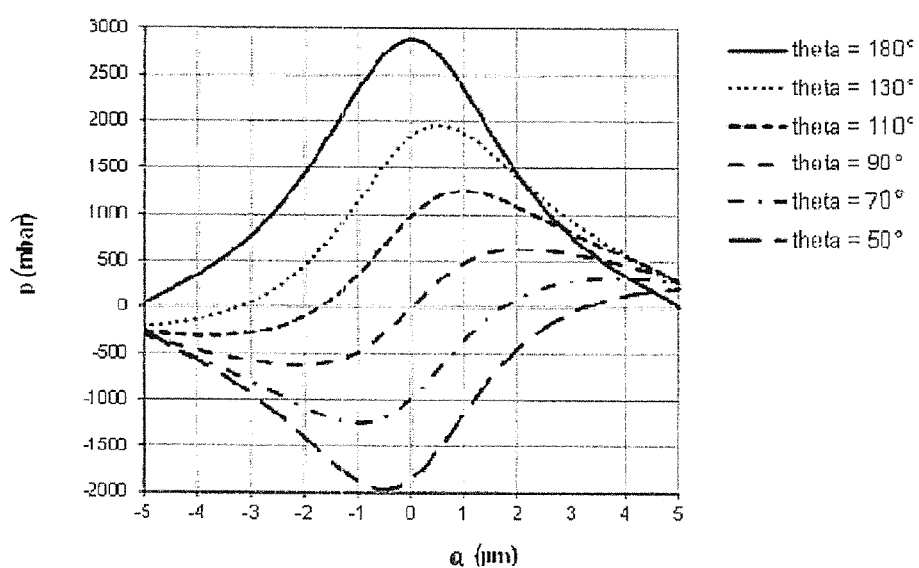
FIG. 4, a diagram of the pressure variation upon the boundary surface passing through a membrane pore for different contact angles.

FIG. 4 shows that pressure difference ΔP as a function of the parameter a for different contact angles $\Theta$ between 180° and 50°. One sees that, at a contact angle $\Theta = 180°$, corresponding to a complete nonwettability of the membrane surface with the medium M1, a maximum pressure difference would occur if the contact points 26 were situated in the membrane plane 22. With increasing wettability and thus with decreasing contact angle $\Theta$, the maximum pressure difference decreases. At the same time, the maximum shifts toward a positive value of a. Moreover, one observes that a negative pressure difference even occurs at small a, that is, the boundary surface tension or surface energies ensure that the medium M1 has penetrated some distance into the pore opening. This knowledge will help in understanding the following description of the process.

FIGS. 5 and 6 will explain sample embodiments of the fluidic system of the invention, as well as the method of the invention for its operation. FIG. 5 shows a sequence of 7 consecutive snapshots of the fluidic system in highly simplified schematic form. The same segment is shown in all snapshots. This has essentially one fluidic line bounded by a surface 30 of a substrate and one fluidic line in a membrane 32 geometrically separating a first volume V1 and a second volume V2. The membrane 32 is represented by circular membrane elements, between which open pores 34 are formed.

In the fluidic line there is a first medium M1 situated to the left of the membrane 32 and a second medium M2 essentially to the right of the membrane 32. Between the two media M1 and M2 is formed a boundary surface 36. Furthermore, to the left of the first medium M1 is situated a third medium M3, between which and the first medium M1 is formed a second boundary surface 42. Thus, the first medium M1 has a limited volume between the boundary surfaces 36 and 42.

The fluidic system furthermore has a first electrode in the form of a conducting substrate of the membrane 32 or a conducting coating of the membrane 32 (neither of them shown) and on the other hand a second electrode 38 arranged in the immediate vicinity of the membrane 32. The first and the second electrode are connected to a power source. Between the two electrodes no voltage is applied at snapshot "1", which essentially describes a state $Z_1$. State $Z_1$, furthermore, is defined of course by a first electromagnetic radiation $S_1$ and a first temperature $T_1$, but the latter parameters play no role in the present sample embodiment, because they do not vary and are therefore not specified here. At snapshot "1", moreover, a pressure $P_1$ prevails in the first medium M1 and a pressure $P_2$ in the second medium M2. The pressure difference $\Delta P=P_1-P_2$ is the driving force to move the media M1 and M2 and the boundary surface 36 in the direction of the arrow 40 toward the membrane 32.

The diagram of FIG. 6A shows the pressure difference $\Delta P$ as a function of time. The snapshot "1" is situated in the segment of the diagram marked "1". The pressure difference $\Delta P$ here is constant at low level, because the driving of the boundary surface 36 in the direction of the membrane is not opposed by any substantial resistance.

This changes upon reaching the membrane 32, which is shown in the snapshot "2". The system is still in the state $Z_1$ with no potential difference between the two electrodes. The system is configured such that the pore surface of the membrane 32 is not wetted or less wetted by the first medium and more heavily wetted by the second medium M2. Furthermore, the system strives to maintain a constant volume flow through the fluidic line, so that the pressure rises sharply just after contact of the boundary surface 36 with the membrane 32. This results, in snapshot "2", in a strongly convex curvature of the boundary surface 36 between the membrane elements, similar to FIG. 3C, from which one can also read the contact angle $\Theta_1>90°$.

Corresponding to snapshot "2", the diagram of FIG. 6A shows in segment "2" that the pressure difference rises to a maximum $P_{max}$. Upon closer scrutiny of the pressure curve, one sees that, at the instant when the front boundary surface 36 reaches the membrane, the initial wetting of the membrane results in an accelerated movement of the medium M2 in the direction of the membrane, due to the boundary surface tension, and consequently to a slight pressure drop, because the media are moving faster than the volume delivery of the system. This holds at least for all (real) contact angles <180°. Only then does the pressure rise to $P_{max}$. The first medium has now penetrated to a maximum depth into the pores, yet the boundary surfaces 36 of neighboring pores do not make contact, so that the boundary surface of the liquid cannot penetrate through the membrane.

The so-called maximum delivery pressure $P_{max}$ is dictated by the system and established by the dimensioning of the delivery pump or by pressure limiting means. Evidently, the boundary surface 36 at the maximum delivery pressure does not yet break through the pores of the membrane, because the boundary surface tension can withstand even greater pressures. The so-called pressure breakthrough is thus substantially higher in state $Z_1$. It corresponds to the first contact angle $\Theta_1$, as illustrated approximately in the diagram of FIG. 4. If one assumes, for example, that the contact angle $\Theta_1$ in state $Z_1$ is 130°, this corresponds to a pressure breakthrough of 2000 mbar for the pore geometry and boundary surface tension assumed there.

If the system changes to state $Z_2$, this changes at least the surface energy of the pore surface of the membrane 32, so that a second contact angle $\Theta_2<\Theta_1$ is formed between the pore surface and the boundary surface 36. In the sample embodiment of FIG. 5, state $Z_2$ differs from state $Z_1$ by an electric field $E_2 \neq E_1$ or by a potential difference $V \neq 0$. The instant after the switching is shown in snapshot "3". The pore surface is now wetted more heavily with the medium M1 and the curvature of the boundary surface 36 is reduced.

In the pressure vs. time diagram of FIG. 6A, the behavior in segment "3" is shown. The pressure difference begins to drop immediately after the electric field is turned on—the voltage curve is shown as a rectangle underneath the pressure curve. The reason for this is that, after the state $Z_2$ is established, a different contact angle $\Theta_2$ results, corresponding to a pressure breakthrough Pdlo at which the boundary surface passes through the membrane, the breakthrough pressure $P_{dlo}$ now being smaller than the maximum delivery pressure $P_{max}$.

Under these conditions, the first medium M1 can penetrate more deeply into the pores 34 until the liquid surfaces of neighboring pores join up and form a new common front boundary surface. The membrane is entirely wetted and rinsed by the medium M1. Thus, the media are delivered onward, which is shown in snapshot "4". The pressure difference has dropped, except for a constant value during segment "4", which is slightly higher than the pressure difference at the time of snapshot "1". This is due to the fact that the membrane 32 presents a greater flow resistance to the medium M1 in this example than it does to the medium M2. Therefore, in this sample embodiment, M1 has a higher viscosity than medium M2.

The snapshot "5" shows the behavior of the fluidic system, which continues to be in state $Z_2$, at the instant when the second boundary surface 42 touches the membrane 32, whereupon the delivery of the media M2, M1 and M3 through the pores of the membrane again stops. The stopping in the corresponding segment "5" of the diagram of FIG. 6 is confirmed by a pressure rise up to the maximum delivery pressure $P_{max}$. The reason for this is that the third contact angle $\Theta_3$ forming between the boundary surface 42 and the pore surface corresponds to a breakthrough pressure $P_{dhi}$, which is likewise greater than the maximum delivery pressure $P_{max}$. Similar to segment "2", also in segment "5" the initial wetting with the medium M3 upon reaching the membrane at first leads to a pressure drop for all contact angles >0°, as shown by the curve of the diagram in FIG. 6A.

The breakthrough pressure $P_{dhi}$ for the boundary surface 42 is generally not the same as the breakthrough pressure for the boundary surface 36. These are only the same if $\Theta_3=180-\Theta_1$. Obviously, therefore, the medium M1 wets the pore surface of the membrane 32 more heavily than does the medium M3, which is consistent with a third contact angle $\Theta_3<90°$. From the standpoint of the medium M3, the situation at the boundary surface with the medium M1 is similar to that of snapshot "2" from the standpoint of the medium M1 at the boundary surface with the medium M2.

In order for the rear boundary surface 42 to also become detached from the membrane 32, the fluidic system is switched to a state $Z_3$ with an electric field $E_3 \neq E_2$, as shown in snapshot "6". This again leads to an immediate pressure drop, because by changing at least one of the surface energies of the pore surface of the membrane 32 and/or the media a fourth contact angle $\Theta_4 > \Theta_3$ is formed between the pore surface and the boundary surface 42, which corresponds to a breakthrough pressure $P_{dlo}$, which is smaller than the maximum delivery pressure $P_{max}$. After this, the media M3, M1 and M2 can be further transported in the direction of the arrow 40 by exerting a lower delivery pressure, see snapshot "7", the necessary delivery pressure being dependent on the viscosity of the medium M3 and can be different than that in snapshots "1" or "4".

FIGS. 5 and 6 show that the invention makes it possible to transport the medium M1 in controlled manner through the membrane 32 by a switching of the states, here, the electric field or the voltage applied between the electrodes 38 and the membrane 32. In a typical application, the medium M1 is a drop of liquid, while media M2 and M3 are gases, preferably the same gas. Accordingly, it makes sense to choose identical states $Z_3$ and $Z_1$.

Before the switching on or off of the voltage during the switching from state $Z_1$ to $Z_2$, and from $Z_2$ to $Z_3$, it may make sense to initially reduce the delivery pressure on account of the very fast pressure drop, in order to prevent an abrupt formation of the combined new boundary surfaces 36 and 42.

The sample embodiment shown in FIG. 6 shows the case of a volume control in which the system strives to maintain the transported volume constant, and the switching of the states occurs after reaching the maximum delivery pressure. Alternatively, the system can also be set up to automatically implement the states in order to relieve the load on the system even before reaching a threshold pressure. For this purpose, the delivery pressure must be monitored by means of a pressure sensor and upon crossing the threshold pressure in the first volume M1 it must be set automatically at the second state by means of a controller. The threshold pressure can be chosen freely, but in any case it is less than the maximum delivery pressure.

FIG. 6B shows a pressure-controlled fluidic system as an alternative. This system strives to maintain a constant pressure difference. This occurs by means of a monitoring of the volume flow V. In segment "1" of FIG. 5 the volume flow is constant. If the front boundary surface 36 between the medium M1 and medium M2 reaches the pore surface of the membrane 32, this results in an initial transient rise in the volume flow and then a very rapid decline, down to total stoppage of the transport in segment 2 of the diagram, because the delivery pressure is not enough to overcome the boundary surface tension.

The constant delivery pressure $P_c$, once more, is dictated by the system and established by the dimensioning of the delivery pump or by pressure limiting means.

After switching from state $Z_1$ to $Z_2$, as shown by the broken line 44 of the voltage, the volume flow again rises in segment "3", until a volume flow corresponding to the constant delivery pressure $P_c$ is reached, which is less than that in segment "1" on account of the different flow resistance of the medium M1. If the rear boundary surface 42 between the medium M1 and the adjacent medium M3 reaches the membrane, the volume flow after a transient initial rise again collapses because the constant delivery pressure $P_c$ is once more smaller than the breakthrough pressure $P_{dhi}$ corresponding to the contact angle $\Theta_3$. This configuration is maintained in segment "5" until the voltage, or the electric field, is again switched off and a state $Z_3$ is produced, in which the rear boundary surface 42 can also become detached from the membrane 32, see segment "6" in the diagram of FIG. 6B. The volume flow now rises again. If the media M2 and M3 are identical or have at least the same viscosity, the volume flow in segment "7" will be equal to that in segment "1".

In FIGS. 7A to 7C the fluidic system is again shown schematically, but in somewhat more detail. The surface of the fluidic line 50 is formed in a substrate of an essentially flat microfluidic chip 52, as shown, for example as a channel in the plane of the substrate 52. It is also possible, in a departure from this, to arrange the membrane in a segment of the fluidic line in which it changes sides perpendicular to the plane of the substrate. A membrane 54 is preferably introduced perpendicular to the direction of the line, geometrically separating the fluidic line 50 into a first volume V1 and a second volume V2. The membrane 54, or more precisely the core of the membrane, not shown here explicitly, or a deeper lying layer of the membrane 54, is electrically conductive and connected to a voltage source. The surface of the fluidic line 50 is provided with a second electrode in the immediate vicinity of the membrane 54. This second electrode can surround the membrane 54, for example, as a ring. It can be vaporized or otherwise deposited as a layer on the inner surface of the fluidic line 50. The precondition for this second electrode 56 is that it protrudes into the first volume V1 and into the second volume V2 and can produce a contact here with the media situated in these volumes. If a voltage difference is imposed between the first electrode in the membrane 54 and the second electrode 56, an electric field will form in the region of the membrane 54. This electric field is used in the above described manner to manipulate the contact angle between the pore surface of the membrane 54 and a boundary surface 58 between a first medium M1 and a second medium M2 between the pore surface of the membrane 54 or a second boundary surface 60 between the first medium M1 and a third medium M3.

FIGS. 8A to 8G show a sample use of the fluidic system of the invention, being used here as a valve without mechanically moving parts. The fluidic system in this case has four volumes V1, V2, V3 and V4. The second volume V2 is geometrically separated from the first volume V1 by means of a first membrane 80, from the third volume V3 by means of a second membrane 82 and from the fourth volume V4 by means of a third membrane 84. The first volume V1 together with the second volume V2 and the first membrane 80 is part of a first fluidic system 86 of the above-described kind, the second volume V2 together with the third volume V3 and the second membrane 82 is part of a second fluidic system 88, and the second volume V2 together with the fourth volume V4 and the third membrane 84 is part of a third fluidic system 90. All three membranes are identical in construction and therefore have the same surface energies in the same state.

Figure 8A:
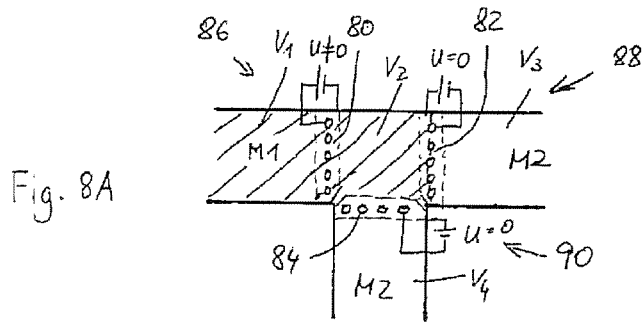
FIG. 8A-G, a sample embodiment of the fluidic system as a valve in a sequence of different switching states.

The first fluidic system 86 according to FIG. 8A is in a state $Z_2$, in which a potential difference U is imposed between the first and the second electrode of the first membrane 80; the second fluidic system 88 is in a state $Z_1$ in which no potential difference U is imposed between the first and the second electrode of the second membrane 82; and the third fluidic system 90 is in a state $Z_1$ in which no potential difference U is imposed between the first and the second electrode of the third membrane 84. If a first medium M1 is under pressure in the first volume V1, thanks to the wettability of the first membrane 80 it can pass through the latter and penetrate to the second and third membrane. In the third volume V3 and the fourth volume V4 there is a second medium M2 and this forms a boundary surface with the first medium M1 at the second and third membrane 82, 84. It is assumed that the medium M1 wets the pore surface of the second and third membranes in state $Z_1$ less than the medium M2, so that a contact angle $\Theta_1 > 90°$ is formed here from the standpoint of the medium M1. The transporting of the media from the volume V2 into the volumes V3 and V4 stops under the condition that the delivery pressure does not exceed the breakthrough pressure at the membrane 82. The same holds at the third membrane 84.

Figure 8B:
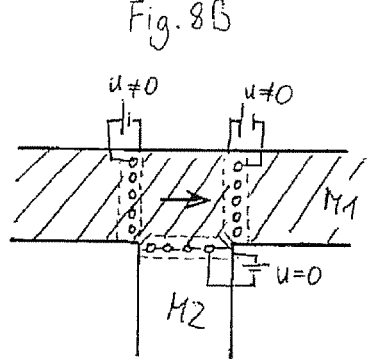
Figure 8E:
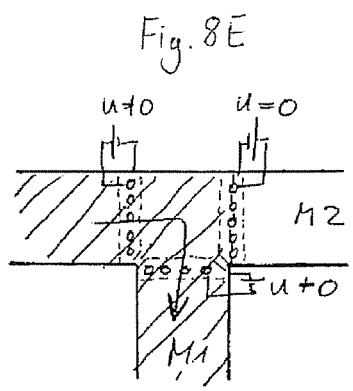

This changes, according to FIG. 8B, when the system is switched to a state $Z_2$ by changing the potential difference at the second membrane 82. Hereupon, the medium M1 wets the pore surface of the membrane 80 in the manner described above and can be transported through the pores of the membrane into the volume V3 without increasing the delivery pressure. In this state according to FIG. 8B it is assumed that the relations at the third membrane 84 have not changed, so that in this regard still no transport of the medium M1 into volume V4 can occur.

Figure 8C:
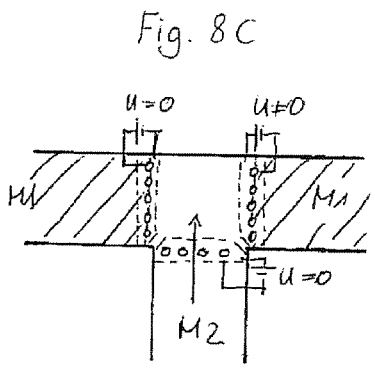
Figure 8F:
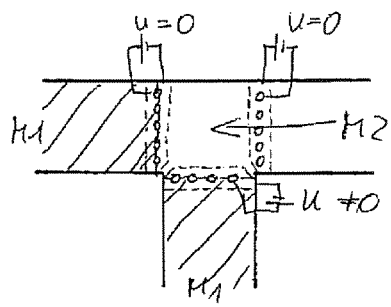
Figure 8D:
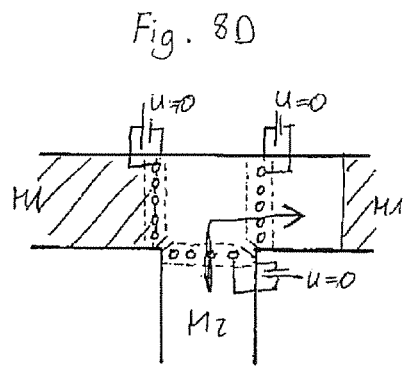
Figure 8G:
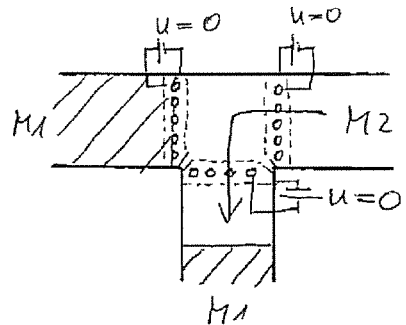

In FIG. 8C, the voltage in the region of the first membrane 80 is again removed, so that the transport of the medium M1 through the first membrane 80 stops. At the same time, the portion of the medium M1 already transported through the membrane 80 is further transported with the help of the medium M2 from the fourth volume V4 into the volume V3. The process stops when the boundary surface between the first and the second medium reaches the second membrane 84. By switching the system 88 at the second membrane 84 back to the state $Z_1$, see FIG. 8D, the first medium M1 can be further transported in the third volume V3, until for example the starting state is again restored, as shown in FIG. 8A. According to FIG. 8E to 8G, the switching sequence repeats between states Z1 and $Z_2$ with the reverse polarity at the second and third membranes 82 and 84, so that a limited volume of the medium M1 is now transported away through volume V4.

In this simple design, a fluidic system can be created for separation of liquid columns without mechanical valves. The operating of such a valve by applying voltages is much more simple in design than mechanical valves, which require mechanical actuators. It is also less prone to error and wear.

Another application of the fluidic system of the invention is its use as a switchable filter for separating two media which cannot dissolve into each other or mix with each other.

Although only sample embodiments making use of electro-wetting are described above, it should be pointed out once more that this phenomenon is mentioned only as an example, and it can be replaced by an electromagnetic radiation or temperature increase at the membrane with identical effect.

The invention further relates to the following:

1. A method for operating a fluidic system with a first volume, a second volume, and a membrane geometrically separating the two volumes, which provides an open-pore microstructure with a pore surface, comprising the steps: producing a first state $Z_1$ with a first electric field $E_1$ in a region of the membrane and a first electromagnetic radiation exposure $S_1$ acting on the membrane and a first temperature $T_1$ of the membrane, wherein the pore surface, a first medium and a second medium have surface energies and wherein the membrane has a pore surface which is not wetted or less wetted by the first medium and more heavily wetted by the second medium, transporting the first medium and the second medium, between which a boundary surface is formed, from the first volume through the membrane into the second volume until the boundary surface touches the membrane, wherein a first contact angle $\Theta_1 > 90°$ is formed between the pore surface and the boundary surface in the first medium and the transporting is halted while the first medium is still situated mainly in the first volume and the second medium is already mainly in the second volume, producing a second state $Z_2$ with a second electric field $E_2 \neq E_1$ in the region of the membrane and/or a second electromagnetic radiation exposure $S_2 \neq S_1$ acting on the membrane and/or a second temperature $T_2 \neq T_1$ of the membrane, wherein at least one surface energy is reversibly changed so that a second contact angle $\Theta_2 < \Theta_1$ is formed between the pore surface and the boundary surface, and further transporting of the first and second medium until the first medium is also taken through the membrane and mainly into the second volume.

2. The method according to 1, wherein the second contact angle in the second state is $\Theta_2 < 90°$.

3. The method according to one of 1 or 2, wherein the first state $Z_1$ is defined by a first electric field $E_1 = 0$, a first electromagnetic radiation exposure $S_1$ in a form of daylight or room lighting or darkness, and a first temperature $T_1$ in the range of normal room temperature.

4. The method according to one of 1 to 3, wherein the transporting occurs with a constant volume flow Vc up to a maximum delivery pressure $P_{max}$.

5. The method according to 4, wherein the first contact angle $\Theta_1$ corresponds to a breakthrough pressure $P_{dhi}$ at which the boundary surface passes through the membrane and which is greater than the maximum delivery pressure $P_{max}$.

6. The method according to 5, wherein the second contact angle $\Theta_2$ corresponds to a breakthrough pressure $P_{dlo}$ at which the boundary surface passes through the membrane and which is smaller than the maximum delivery pressure $P_{max}$.

7. A method according to one of 4 to 6, further including detecting a pressure change in the first or second volume and putting out a pressure change signal.

8. The method according to 7, wherein a second state $Z_2$ is produced in response to the pressure change signal and upon going above a threshold pressure in the first volume or going below a threshold pressure in the second volume.

9. The method according to one of 1 to 3, wherein the transporting occurs with a constant delivery pressure $P_c$.

10. The method according to 9, wherein the first contact angle $\Theta_1$ corresponds to a breakthrough pressure $P_{dhi}$ at which the boundary surface passes through the membrane and which is larger than the constant delivery pressure $P_c$.

11. The method according to 10, wherein the second contact angle $\Theta_2$ corresponds to a breakthrough pressure $P_{dlo}$ at which the boundary surface passes through the membrane and which is smaller than the constant delivery pressure $P_c$.

12. The method according to one of 9 to 12, further including detecting a volume flow change in the second volume and putting out a volume flow change signal.

13. The method according to 12, wherein an electric field is applied in the region of the membrane or electromagnetic radiation is beamed onto the membrane or the membrane is heated in response to the volume flow change signal and crossing below a threshold volume flow.

14. The method according to one of 1 to 13, wherein the first medium has a limited volume with a second boundary surface to a third medium formed at its end in the delivery direction, while the further transporting of the first medium through the membrane into the second volume stops when the second boundary surface touches the membrane and a third contact angle $\Theta_3$ arises between the second boundary surface and the pore surface.

15. The method according to 14, with the additional steps: producing a third state $Z_3$ with a third electric field $E_3 \neq E_2$ in the region of the membrane and/or a third electromagnetic radiation $S_3 \neq S_2$ acting on the membrane and/or a third temperature $T_3 \neq T_2$ of the membrane, wherein by changing at least one surface energy a fourth contact angle $\Theta_4 < \Theta_3$ is formed between the pore surface and the boundary surface, further transporting of the first medium in the second volume.

16. The method according to 15, wherein the third contact angle is $\Theta_3 < 90°$ in the second state $Z_2$ and the fourth contact angle is $\Theta_4 > 90°$ in the third state $Z_3$.

17. The method according to one of 14 to 16, wherein the second medium and the third medium are the same.

18. The method according to one of 15 to 17, wherein the first state $Z_1$ and the third state $Z_3$ are the same.

19. The method according to one of 1 to 18, wherein the second electric field $E_2$ is applied in the region of the membrane with a field strength of 1 V/m to 10 kV/m.

20. The method according to one of 1 to 19, wherein light of a wavelength between 0.1 µm and 3 µm is beamed onto the membrane.

21. The method according to one of 1 to 20, wherein the membrane is heated to a temperature $T_2$ between 10° C. and 100° C.

LIST OF REFERENCE SYMBOLS 10 boundary surface
11 substrate surface
12 substrate electrode/first electrode
14 dielectric layer
16 second electrode
18 voltage source
20 membrane element
22 membrane plane
24, 24', 24" boundary surface
26, 26', 26" contact point
30 fluidic line
32 membrane
34 membrane pore
36 first boundary surface
38 second electrode
40 transport direction
42 second boundary surface
44 voltage signal
50 fluidic line
52 substrate of a microfluidic chip
54 membrane
56 second electrode
58 first boundary surface
60 second boundary surface
80 first membrane
82 second membrane
84 third membrane
86 first fluidic system
88 second fluidic system
90 third fluidic system
M1 first medium
M2 second medium
M3 third medium
V1 first volume
V2 second volume
V3 third volume
V4 fourth volume
$Z_1$ first state
$Z_2$ second state
$Z_3$ third state
$\Theta_1, \Theta_2, \Theta_3$ contact angle
$P_1, P_1', P_1''$ pressure in first medium
$P_2, P_2', P_2''$ pressure in second medium
$a, a', a''$ distance of contact points from the membrane plane
$\alpha, \alpha', \alpha''$ angle of contact points to the membrane plane
r radius of the membrane element
d minimum pore diameter
$P_{max}$ maximum delivery pressure

What is claimed is:

1. A fluidic system comprising: a first volume, a second volume, and a membrane geometrically separating the two volumes, which provides an open-pore microstructure with a pore surface for passage of a first medium and a second medium, between which a boundary surface is formed, while a contact angle exists between the boundary surface and the pore surface,
wherein there are in the fluidic system electrodes for imposing an electric field in a region of the membrane and/or an electromagnetic radiation source acting on the membrane and/or means for heating or cooling the membrane,
wherein the membrane in a first state $Z_1$ with a first electric field $E_1$ and a first electromagnetic radiation exposure $S_1$ and a first temperature $T_1$ has a pore surface which is not wetted or less wetted by the first medium and more heavily wetted by the second medium so that a first contact angle $\Theta_1 > 90°$ is formed between the pore surface and the boundary surface in the first medium, and
wherein the first medium and the second medium and the pore surface have a surface energy, of which at least one surface energy can be changed reversibly in dependence on the electric field or by electromagnetic radiation exposure or temperature change so that in a second state $Z_2$ with a second electric field $E_2 \neq E_1$ and/or a second electromagnetic radiation exposure $S_2 \neq S_1$ and/or a second temperature $T_2 \neq T_1$ a second contact angle $\Theta_2 < \Theta_1$ is formed between the pore surface and the boundary surface.

2. The fluidic system according to claim 1, wherein the first state $Z_1$ is defined by a first electric field $E_1 = 0$, a first electromagnetic radiation exposure $S_1$ in a form of daylight or room lighting or darkness, and a first temperature $T_1$ in a range of normal room temperature.

3. The fluidic system according to claim 1, wherein the pore surface is hydrophobic in the first state and the first medium is a water-based liquid.

4. The fluidic system according to claim 3, wherein the second medium is a gas or an oil-based liquid.

5. The fluidic system according to claim 1 wherein the pore surface in the first state is lipophobic and the first medium is an oil-based liquid.

6. The fluidic system according to claim 5, wherein the second medium is a gas or alternatively a water-based liquid.

7. The fluidic system according to claim 1, further including a pump for transporting the media from the first volume through the membrane into the second volume.

8. The fluidic system according to claim 7, wherein the pump is designed to deliver a constant volume flow Vc up to a maximum delivery pressure $P_{max}$.

9. The fluidic system according to claim 8, wherein the first contact angle $\Theta_1$ corresponds to a breakthrough pressure $P_{dhi}$ at which the boundary surface passes through the membrane and which is greater than the maximum delivery pressure $P_{max}$.

10. The fluidic system according to claim 9, wherein the second contact angle $\Theta_2$ corresponds to a breakthrough pressure $P_{dio}$ at which the boundary surface passes through the membrane and which is smaller than the maximum delivery pressure $P_{max}$.

11. The fluidic system according to claim 8, further including a pressure sensor which is arranged and designed so that a pressure change in the first or second volume is detected and a pressure change signal is put out.

12. The fluidic system according to claim 11, further including a controller which is designed, in response to the pressure change signal and upon going above a threshold pressure in the first volume or going below a threshold pressure in the second volume, to put out a switching signal to a power supply for the electrodes or to the electromagnetic radiation source or to the means of heating the membrane.

13. The fluidic system according to claim 7, wherein the pump is designed to transport with a constant delivery pressure $P_c$.

14. The fluidic system according to claim 13, wherein the first contact angle $\Theta_1$ corresponds to a breakthrough pressure $P_{dhi}$ at which the boundary surface passes through the membrane and which is larger than the constant delivery pressure $P_c$.

15. The fluidic system according to claim 14, wherein the second contact angle $\Theta_2$ corresponds to a breakthrough pressure $P_{dio}$ at which the boundary surface passes through the membrane and which is smaller than the constant delivery pressure $P_c$.

16. The fluidic system according to claim 13, further including a volume flow sensor which is arranged and designed to detect a change in the volume flow in the second volume and put out a volume flow change signal.

17. The fluidic system according to claim 16, further including a controller which is designed, in response to the volume flow change signal and upon going below a threshold volume flow, to put out a switching signal to a power supply for the electrodes or to the electromagnetic radiation source or to the means of heating the membrane.

18. The fluidic system according to claim 1, wherein one first electrode is preferably formed by a conducting substrate of the membrane or a conducting coating of the membrane.

19. The fluidic system according to claim 18, wherein the membrane has a layer of a dielectric on top of the first electrode.

20. The fluidic system according to claim 19, wherein the dielectric forms the pore surface.

21. The fluidic system according to claim 18, wherein a second electrode is arranged each time directly adjacent to the membrane in the first and second volume.

22. The fluidic system according to claim 1, wherein the pore surface is formed on the basis of polytetrafluorethylene (PTFE), perfluorisobutene (PFIB), or Parylene.

* * * * *